US011398317B2

(12) United States Patent
Mistreanu et al.

(10) Patent No.: US 11,398,317 B2
(45) Date of Patent: Jul. 26, 2022

(54) APPARATUSES FOR STEAM SEPARATION, AND NUCLEAR BOILING WATER REACTORS INCLUDING THE SAME

(71) Applicant: GE-Hitachi Nuclear Energy Americas LLC, Wilmington, NC (US)

(72) Inventors: Adrian M. Mistreanu, Wilmington, NC (US); James Scott Bowman, Wilmington, NC (US); John S. Bennion, Wilmington, NC (US); Phillip Glen Ellison, Wilmington, NC (US); Bulent Alpay, Wilmington, NC (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 21 days.

(21) Appl. No.: 16/736,044

(22) Filed: Jan. 7, 2020

(65) Prior Publication Data

US 2020/0152342 A1 May 14, 2020

Related U.S. Application Data

(62) Division of application No. 15/492,163, filed on Apr. 20, 2017, now Pat. No. 10,573,420.

(51) Int. Cl.
*G21C 15/16* (2006.01)
*F22B 37/28* (2006.01)
*B01D 45/04* (2006.01)

(52) U.S. Cl.
CPC ............ *G21C 15/16* (2013.01); *F22B 37/286* (2013.01); *B01D 45/04* (2013.01); *Y02E 30/30* (2013.01)

(58) Field of Classification Search
CPC ...... G21C 15/16; F22B 37/268; F22B 37/286; F22B 37/32; F22B 37/327; B01D 45/04; B01D 45/16
See application file for complete search history.

(56) References Cited

U.S. PATENT DOCUMENTS 46,171 A    1/1865  Wood
2,675,888 A * 4/1954 Blizard ................. F22B 37/322
                                                    122/491

(Continued)

FOREIGN PATENT DOCUMENTS

EP    2560173 A1    2/2013
JP    S56051219 A   5/1981
(Continued)

*Primary Examiner* — Sharon M Davis
(74) *Attorney, Agent, or Firm* — Harness, Dickey & Pierce, P.L.C.

(57) ABSTRACT

According to at least some example embodiments, a dome collector separation stage includes an inner side wall that defines an inner channel; and an outer side wall that, together with the inner side wall, defines an outer channel, the inner channel being configured to receive a two-phase flow stream (FS) of water and steam, and pass the two-phase FS to the outer channel via inlets included in the inner side wall, the outer channel being configured to separate at least some water from the two-phase FS, and pass moisture-reduced steam out of the steam separator stage via outlets included in the outer side wall.

4 Claims, 15 Drawing Sheets

(56) References Cited

U.S. PATENT DOCUMENTS

| | | | | | |
|---|---|---|---|---|---|
| 5,106,573 | A | * | 4/1992 | Fennern | G21C 15/16 376/371 |
| 5,665,130 | A | * | 9/1997 | Nielsen | C10G 11/18 55/307 |
| 5,963,611 | A | * | 10/1999 | Narabayashi | G21C 15/16 376/371 |
| 5,989,302 | A | * | 11/1999 | Krowech | B01D 45/08 122/491 |
| 2007/0201604 | A1 | * | 8/2007 | Chaki | B01D 45/16 376/301 |
| 2010/0055308 | A1 | | 3/2010 | Dulka et al. | |
| 2015/0206606 | A1 | | 7/2015 | Ellison et al. | |

FOREIGN PATENT DOCUMENTS

| | | |
|---|---|---|
| JP | H06174206 A | 6/1994 |
| JP | H11137935 A | 5/1999 |
| JP | 2004205302 A | 7/2004 |
| JP | 2010261821 A | 11/2010 |
| JP | 2011191080 A | 9/2011 |
| JP | 2012058113 A | 3/2012 |
| JP | 2012117917 A | 6/2012 |
| JP | 2012154654 A | 8/2012 |

* cited by examiner

TOP VIEW

BOTTOM VIEW

APPARATUSES FOR STEAM SEPARATION, AND NUCLEAR BOILING WATER REACTORS INCLUDING THE SAME

CROSS-REFERENCE TO RELATED APPLICATION

This application is a divisional of U.S. application Ser. No. 15/492,163, filed on Apr. 20, 2017, the entire contents of each of which are hereby incorporated by reference.

BACKGROUND

Field

Example embodiments relate to steam separation systems for a nuclear boiling water reactor.

Description of Related Art

A boiling water nuclear reactor generates steam by utilizing heat generated from a core and rotates a turbine and a power generator by means of the steam. In a pressurized water nuclear reactor, cooling water separately flows into a primary cooling system circulating through the nuclear reactor, and a secondary cooling system serving as a steam generator. In the primary cooling system, high-temperature water is generated by the heat generated from the nuclear reactor core. In the secondary cooling system, water in the secondary cooling system is boiled in a heat exchanger in the steam generator to become steam, which rotates a turbine or a power generator.

Regardless of the reactor type, moisture must be removed from the steam to be supplied to the turbine. To this end, a typical reactor is provided with a plurality of steam separators, dryers and the like so as to remove water from a two-phase flow of steam and water generated in the nuclear reactor or the steam generator.

In a conventional steam separator, even if the water separated from the two-phase flow that has flowed in the steam separator is discharged outside the barrel through the water discharge pipe, most of the steam flows out from the upper part of the barrel. Therefore, if the two-phase flow stream (FS) velocity is high and/or steam separator inlet moisture content is high, the number of the minute droplets that are carried by the steam is increased, which may result in an increase in moisture carry-over. The increase in moisture carry-over increases the radioactivity levels in the plant and adversely affects outage performance. For example, liquid water droplets may transport radioactive particles from the reactor to the balance of plant (BoP). These particles may deposit in various components in the main steam line and turbine and increase the radiation exposure to reactor personnel. If the moisture carry-over levels become undesirably high, certain components of the main steam line and turbine can be adversely impacted as a result of enhanced degradation from such mechanisms such as flow accelerated corrosion leading to higher maintenance costs.

SUMMARY

According to at least some example embodiments, a dome collector separation stage includes an inner side wall that defines an inner channel; and an outer side wall that, together with the inner side wall, defines an outer channel, the inner channel being configured to receive a two-phase flow stream (FS) of water and steam, and pass the two-phase FS to the outer channel via inlets included in the inner side wall, the outer channel being configured to separate at least some water from the two-phase FS, and pass moisture-reduced steam out of the steam separator stage via outlets included in the outer side wall.

The steam separator stage may include an upper section and a lower section, the inlets in the inner side wall and the outlets in the outer side wall may be included in the upper section, and a portion of the outer side wall within the upper section may be curvilinear such that the outer channel is configured to cause the at least some water to separate from the two-phase FS when the two-phase FS impacts the curvilinear portion of the outer side wall, due to a density difference between water and steam portions of the two-phase FS.

The outer channel may be configured such that the at least some water separated from the two-phase FS by the outer channel exits the dome collector separation stage through a portion of the outer channel within the lower section of the dome collector separation stage.

A nuclear boiling water reactor may include a reactor pressure vessel; a core in the reactor pressure vessel; a plurality of steam separators located above the reactor core; and the dome collector separation stage located above the plurality of steam separators.

The plurality of steam separators may include a plurality of peripheral steam separators located in a peripheral portion of an interior space of the reactor pressure vessel, and the dome collector separation stage may be vertically aligned with the plurality of peripheral steam separators such that the inner channel is configured to receive the two-phase FS from the peripheral steam separators.

According to at least some example embodiments, a steam separation system includes a steam separator; and an elbow extension attached to the steam separator, the elbow extension including a channel, the elbow extension being configured to receive a two-phase flow stream (FS) of water and steam from the steam separator, separate at least some water from a two-phase FS, and pass the separated at least some water through the channel and out of an exit portion of the elbow extension.

The elbow extension may include a curved section configured to cause the at least some water to separate from the two-phase FS due to a centripetal force exerted on the two-phase FS as a result of the two-phase FS flowing through the curved section.

A convex surface of a portion of the channel within the curved section may include a plurality of extraction holes configured to pass moisture-reduced steam from the channel out of the elbow extension.

A nuclear boiling water reactor may include a reactor pressure vessel; a core in the reactor pressure vessel; and one or more of the steam separation systems.

The one or more steam separation systems may be located in a peripheral portion of an interior space of the reactor pressure vessel such that the exit portion of each of the one or more steam separation systems faces an inner surface of a side wall of the reactor pressure vessel.

According to at least some example embodiments, a steam separator includes a skirt; a barrel inside the skirt; a first separator stage; and a second separator stage adjacent to the first separator stage, the first separator stage including a first pick-off ring that protrudes from the skirt past the barrel towards an interior of the steam separator, the second separator stage including an inner surface which has a diameter that gradually increases from a first diameter value at a first portion of the second separator stage to a second diameter value at a second portion of the second separator stage.

The first portion of the second separator stage may be a portion of the second separator stage adjacent to the first pick-off ring of the first separator stage, and the second portion of the second separator stage may be a portion of the second separator stage located farther away from the first pick-off ring of the first separator stage than the first portion.

The first diameter value may be equal to a diameter value of an inner surface of the first pick-off ring.

The steam separator may further include a standpipe connected to the first separator stage, wherein the first separator stage further includes turning vanes, the standpipe being connected to an end of the first separator stage opposite an end of the first separator stage at which the first pick-off ring is located.

A nuclear boiling water reactor may include a reactor pressure vessel; a core in the reactor pressure vessel; and one or more of the steam separators located above the reactor core.

BRIEF DESCRIPTION OF THE DRAWINGS

The various features and advantages of non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
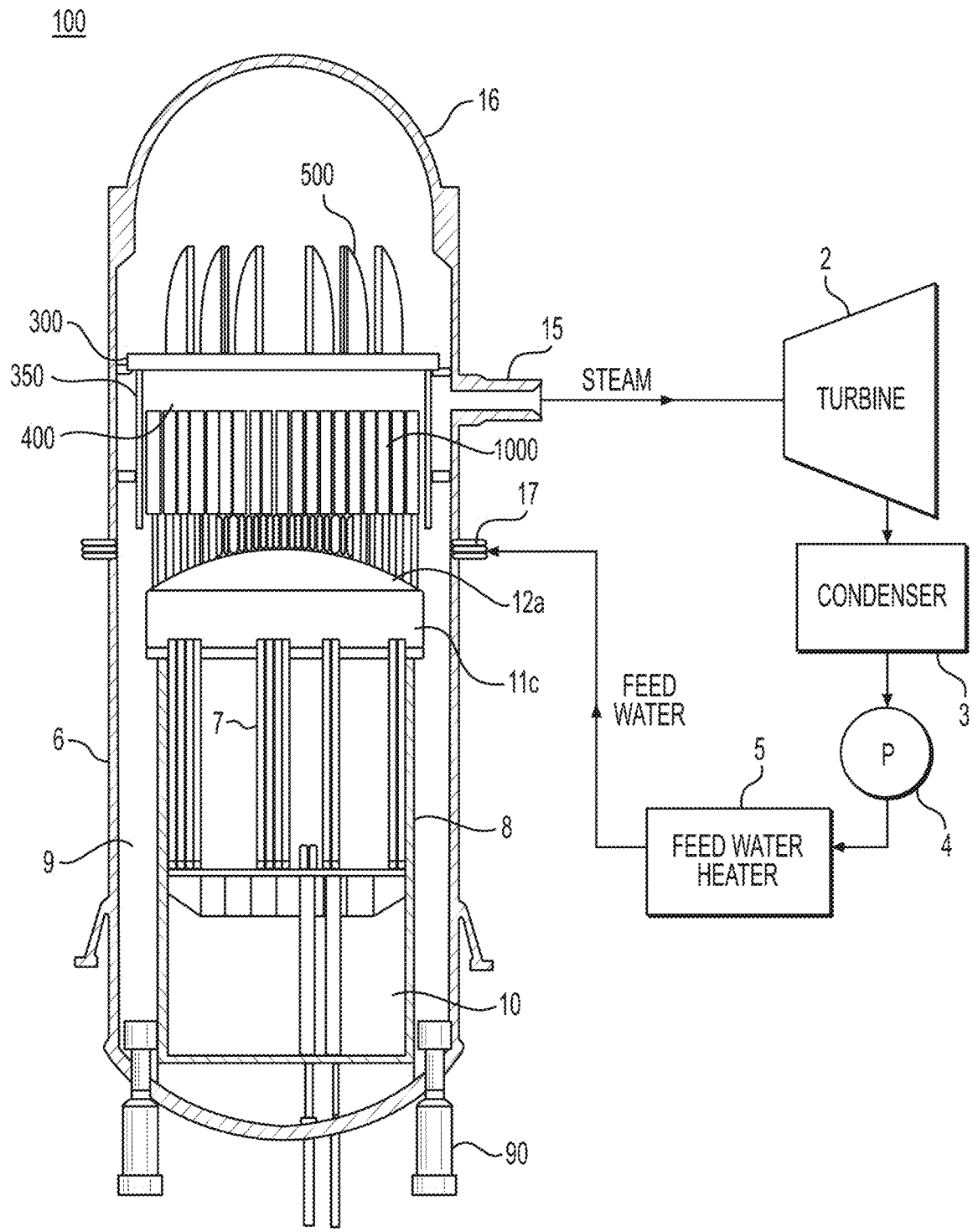
FIG. 1 is a cross-sectional view of at least a portion of a nuclear boiling water reactor (BWR) according to an example embodiment.

It should be understood that when an element is referred to as being "on," "connected to," "coupled to," or "covering" another element, it may be directly on, connected to, coupled to, or covering the other element or intervening elements that may be present. In contrast, when an element is referred to as being "directly on," "directly connected to," or "directly coupled to" another element, there are no intervening elements present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

BWR Structure Overview

FIG. 1 is a cross-sectional view of at least a portion of a nuclear boiling water reactor (BWR) according to an example embodiment. Referring to FIG. 1, in the nuclear BWR 100, a plurality of steam separators 1000 and a steam dryer system 500 having the structure described below are disposed in a dome 16 at the upper portion of the reactor pressure vessel 6. The following is a description of the structure inside the pressure vessel 6.

A cylindrical core shroud 8, which is concentric with the pressure vessel 6, is installed at a lower portion in the pressure vessel 6. A core lower plenum 10 is formed in the lower portion of the shroud 8 in the pressure vessel 6. A core 7 is disposed above this lower plenum 10 and surrounded by the shroud 8. There is also a core upper plenum 11c above the core 7. A shroud head 12a provided to the shroud 8 is disposed above the upper plenum 11c. It is to be noted that an annular space 9 is formed between the pressure vessel 6 and the shroud 8, and functions as a circulation path for the light water coolant.

A prescribed number of holes (not shown) through which coolant passes are provided in the shroud head 12a. The plurality of steam separators 1000 are inserted into these holes and are aligned in parallel. The flow paths that join the core 7 and the steam separator 1000 are connected via the upper plenum 11c.

Also, a steam dryer system 500 is provided above the plurality of steam separators 1000. A support structure 300 (e.g., a support ring as shown) supports the steam dryer system 500 above the steam separators 1000 creating a dryer plenum 400 there between. A cylindrical dryer skirt 350, connected to the support ring, extends downward from the support structure 300. A feed water inlet nozzle 17 and a steam outlet nozzle 15 are provided at the side wall of the pressure vessel 6. Recirculation pumps 90 are provided at the lower portion of the reactor pressure vessel 6.

In the nuclear BWR 100, the wet steam generated in the core 7 by heating light water flows in each of the steam separators 1000 mounted on the shroud head 12a via the upper plenum 11c as a two-phase flow including the light water. In the steam separators 1000, the introduced gas-liquid two-phase flow stream (FS) passes through from the downward direction to the upward direction. Thus, the gas of the gas-liquid two-phase FS may be steam, and the liquid of the gas-liquid two-phase FS may be water. Steam containing moisture that could not be removed is supplied to the steam dryer system 500 positioned above the steam separators 1000.

The steam (saturated steam) from which moisture is further removed by the steam dryer system 500 is exhausted from the steam outlet nozzle 15 and supplied to a turbine 2, for example, via a main steam line (not illustrated) between outlet nozzle 15 and the turbine 2. This steam drives the turbine 2, which rotates a generator (not shown) joined to the turbine 2, and thereby electrical power is generated. The steam exhausted from the turbine 2 is condensed at the condenser 3 and becomes condensed water. The condensed water, that is, the cooling water (light water) is supplied to a feed water heater 5 by a feed water pump 4. The cooling water heated by the feed water heater 5 is re-introduced to the pressure vessel 6 from the feed water inlet nozzle 17.

Meanwhile, the water separated by the steam separators 1000 is mixed with the cooling water supplied from the feed water inlet nozzle 17 and descends the annular space 9 and is introduced to the core 7 via the lower plenum 10. At this time, the cooling water supplied to the core 7 is pressurized by a pump 90, which can be either internal or external to the nuclear BWR 100. As is discussed in greater detail below with respect to FIG. 2, at least some of steam separators 1000 are peripheral separators.

Figure 2:
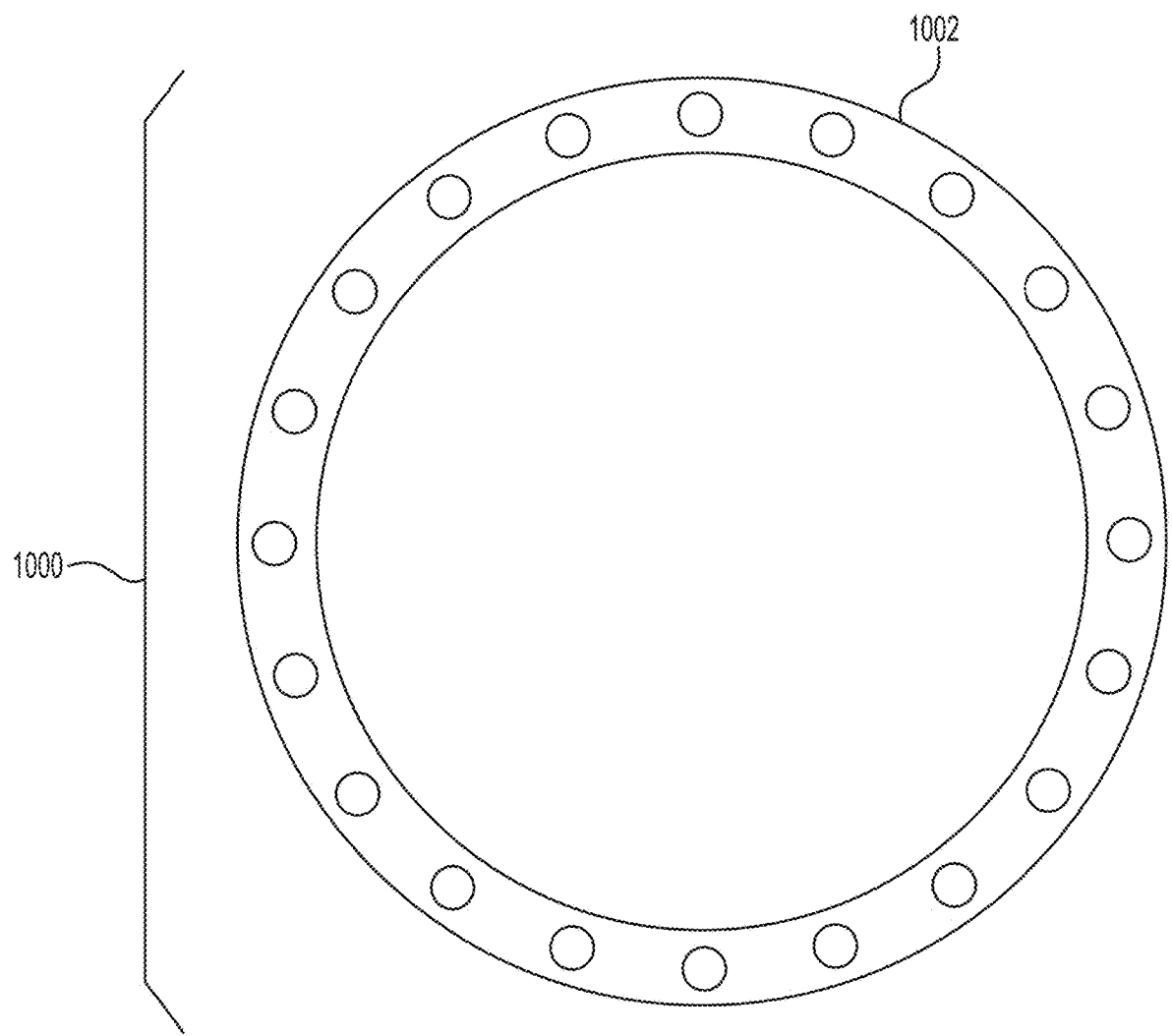
FIG. 2 illustrates peripheral steam separators among the steam separators of the BWR.

FIG. 2 illustrates peripheral steam separators among the steam separators 1000. Referring to FIG. 2, FIG. 2 is illustrated with respect to a view position above the steam separators 1000 of FIG. 1 (e.g., in-between support structure 300 and steam separators 1000) and a view direction that is parallel to longitudinal sides of the steam separators 1000. As is illustrated in FIG. 2, any or all of the steam separators 1000 may be cylindrical in shape and have circular cross sections. Further, at least some of steam separators 1000 may be peripheral steam separators 1002. In the example shown in FIG. 2, the peripheral steam separators 1002 are the separators located between, or substantially between, the two bold concentric circles illustrated in FIG. 2. As is illustrated in FIG. 2, peripheral steam separators 1002 are steam separators located at or near a peripheral portion of an arrangement of the steam separators 1000. According to at least some example embodiments, peripheral steam separators 1002 are steam separators, from among steam separators 1000, that are located at or near a peripheral portion of an interior of pressure vessel 6. As is illustrated in FIG. 2, according to at least some example embodiments, the peripheral steam separators 1002 may be arranged in a ring shape.

According to at least some example embodiments, the gas-liquid two-phase FS that passes through peripheral steam separators 1002 may include more water than the gas-liquid two-phase FS passed by other steam separators (e.g., interior steam separators) among the steam separators 1000. For example, the gas-liquid two-phase FS that passes through peripheral steam separators 1002 may include more water than steam.

Accordingly, it may be desirable to include, in the BWR 100, structures for removing or reducing the water passed by the peripheral steam separators 1002, thereby preventing and/or reducing the exposure of components of the BWR 100 (e.g., a main steam line and/or a turbine 2) to prolonged high radioactivity levels during operation of the BWR 100. As a first example of such structure, a dome collector additional separation state according to at least some example embodiments will be discussed below with reference to FIGS. 3A-5. As a second example of such structure, an elbow extension additional separation stage according to at least some example embodiments will be discussed below with reference to FIGS. 6A-7. As a third example of such structure, a streamlined steam separator including separator pick-off rings according to at least some example embodiments will be discussed below with reference to FIGS. 8-10.

Dome Collector Additional Separation Stage

Figure 3A:
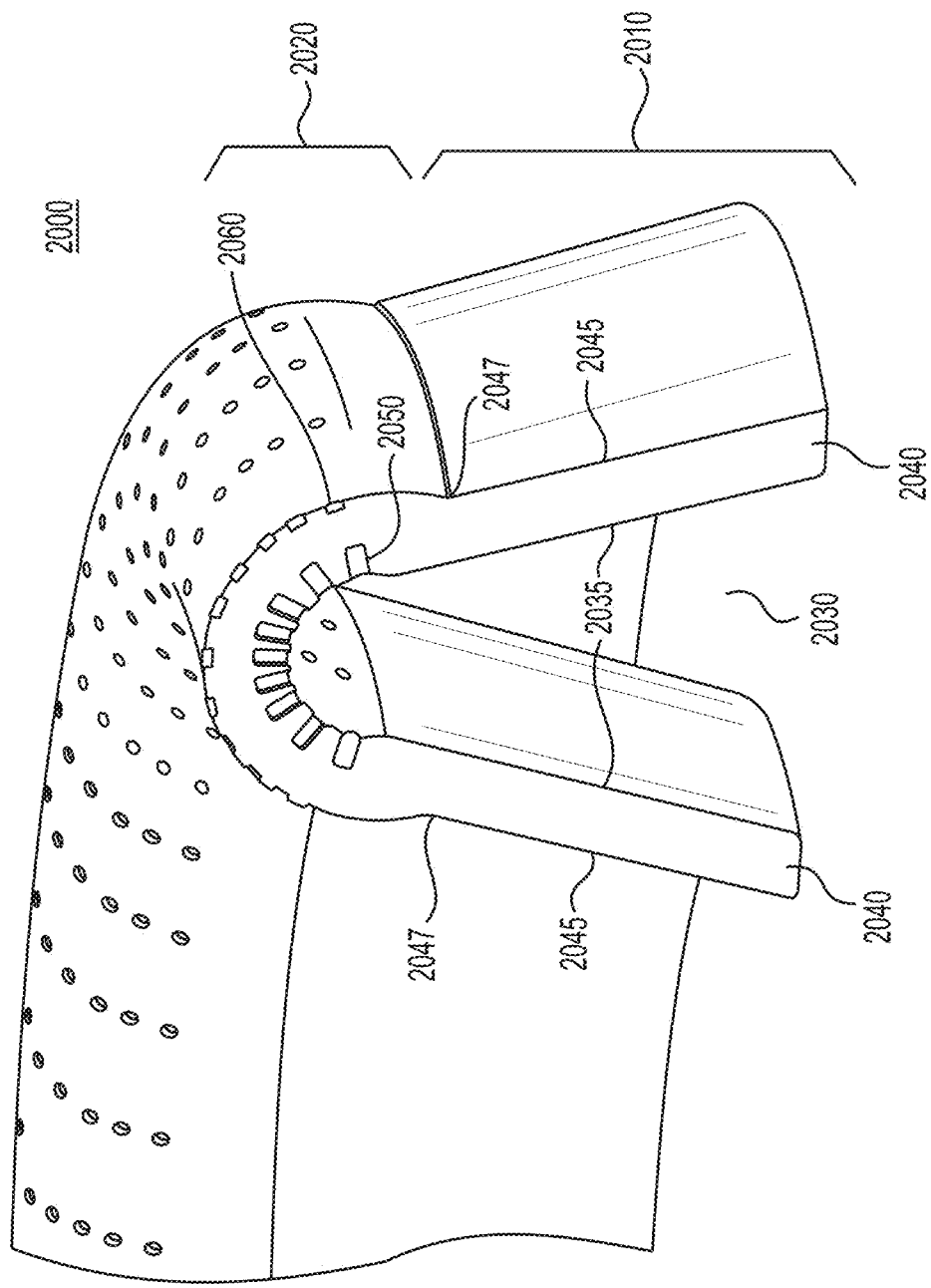
FIGS. 3A-3C illustrate various views of portions of a dome collector additional separation stage according to at least some example embodiments.
Figure 3B:
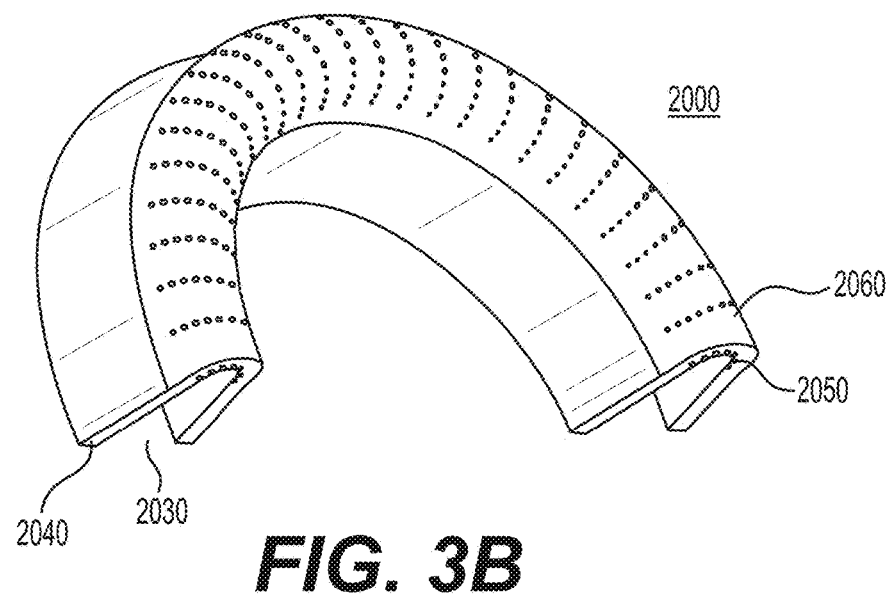
Figure 3C:
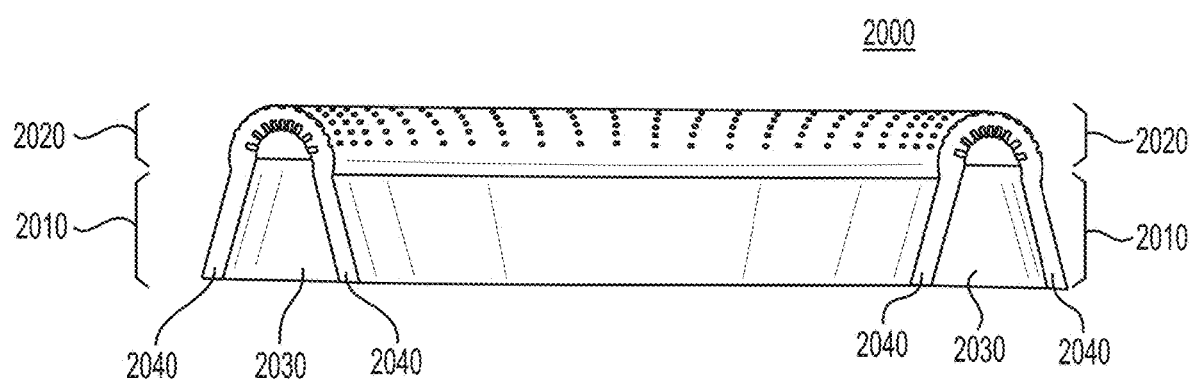
Figure 4A:
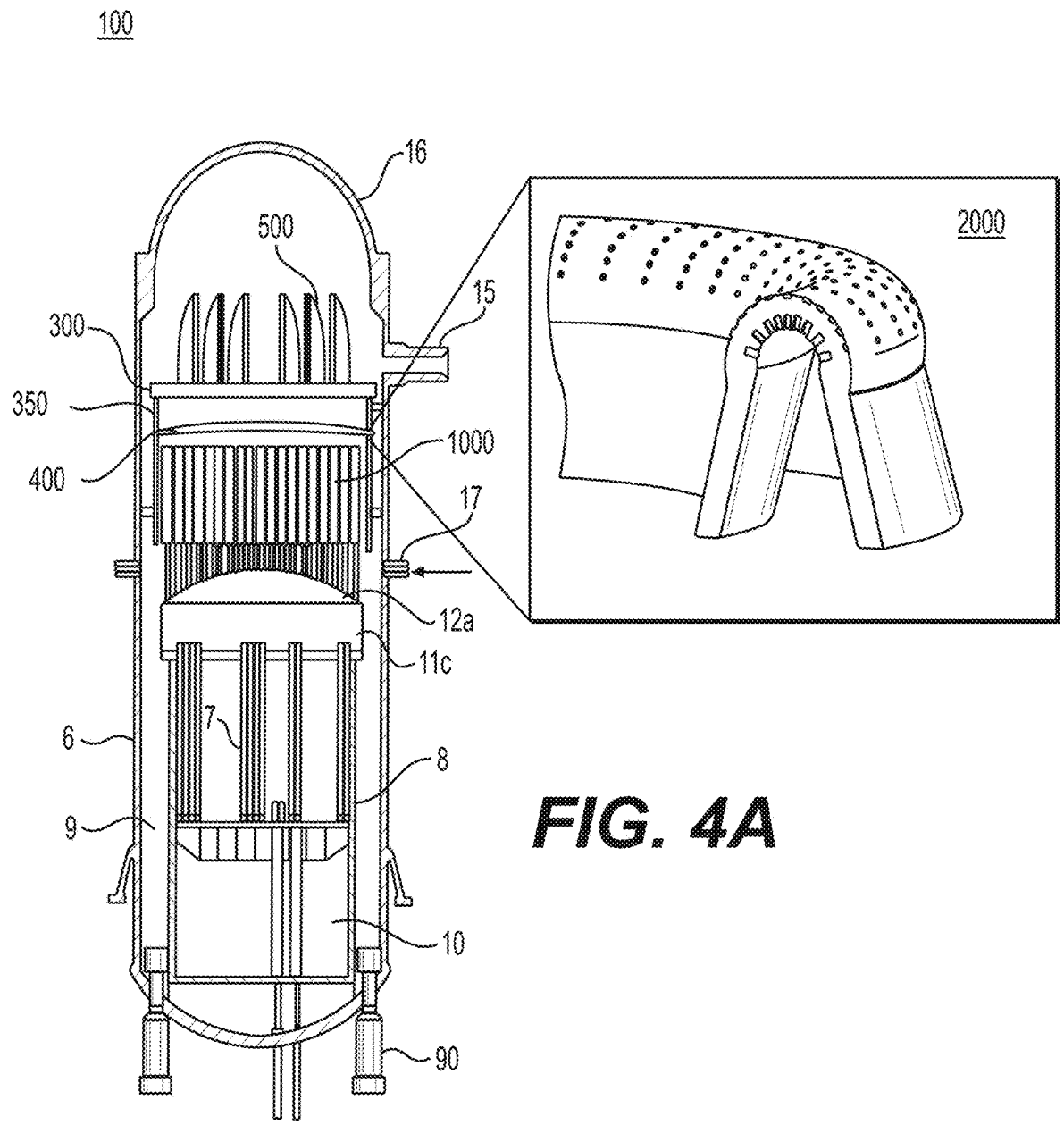
FIGS. 4A-4C are diagrams illustrating an example position of the dome collector within the BWR according to at least some example embodiments.
Figure 4B:
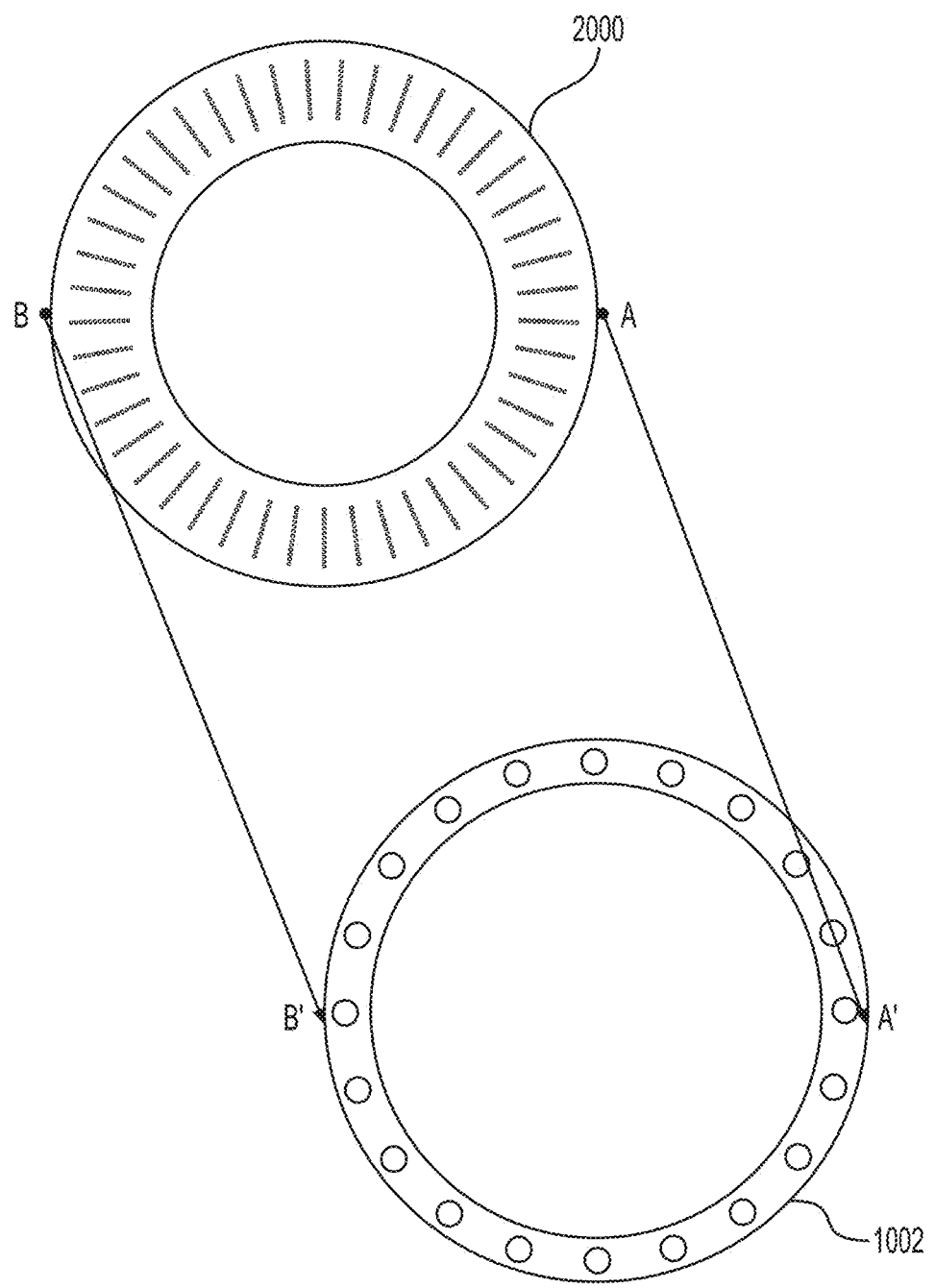
Figure 4C:
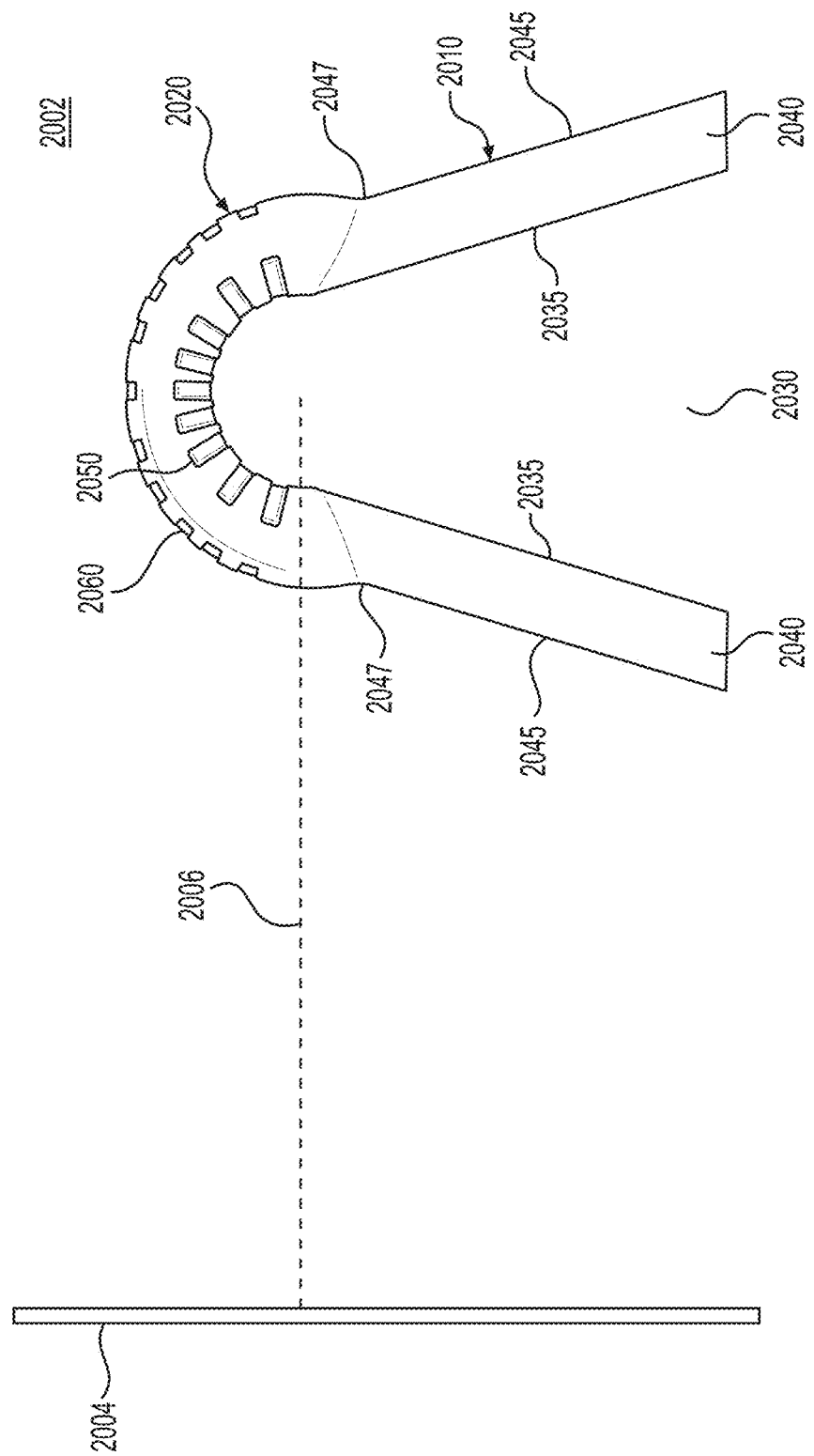
Figure 5:
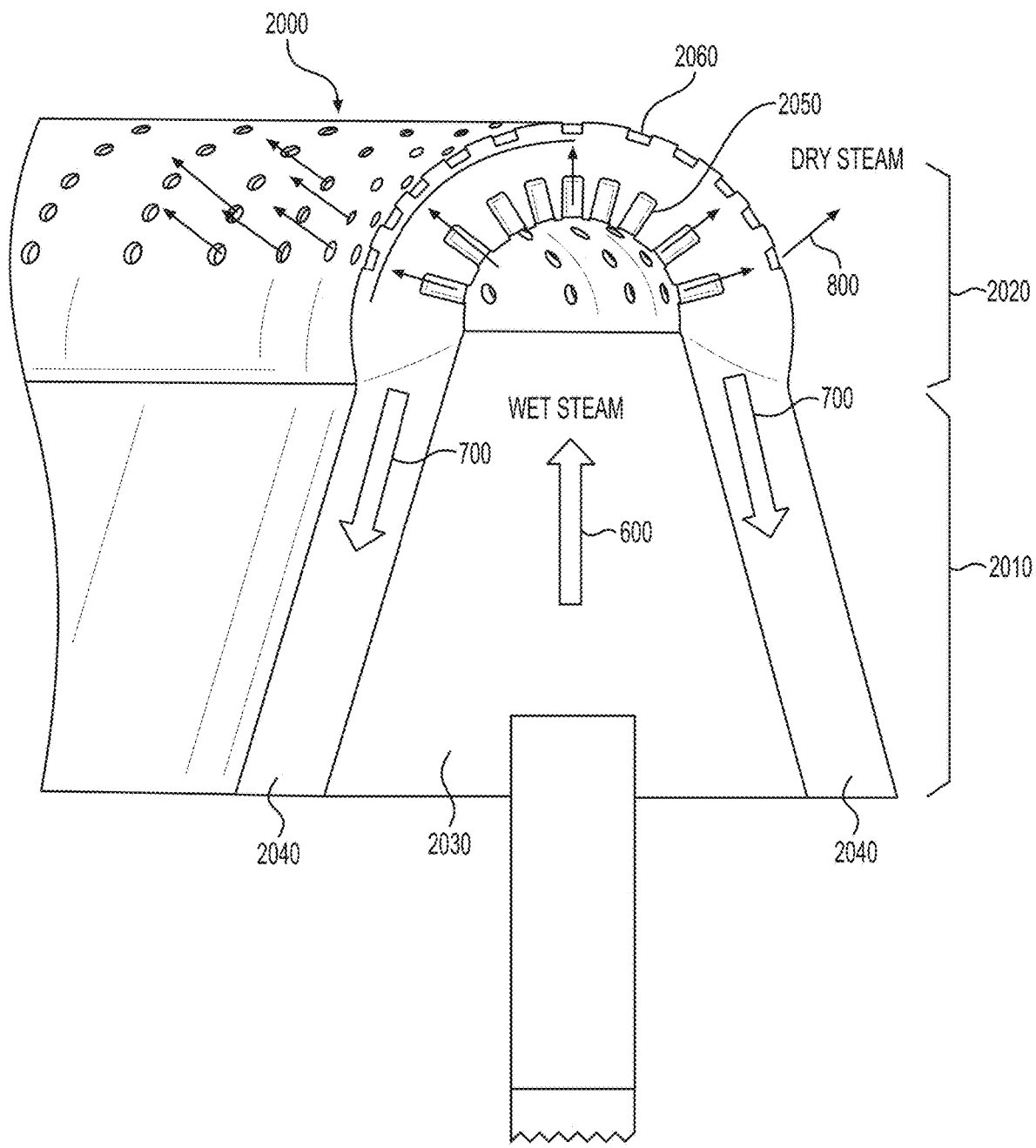
FIG. 5 is a diagram illustrating an example operation of the dome collector.

FIGS. 3A-3C illustrate various views of portions of a dome collector additional separation stage 2000 according to at least some example embodiments. As will be discussed in greater detail below, according to at least some example embodiments, the dome collector additional separation stage 2000 may be provided in addition to the separators 1000 to reduce the amount of water that is passed, within the gas-liquid two-phase FS, to at least some components of the BWR 100 (e.g., the dryer system 500, main steam line, and/or turbine 2). The dome collector additional separation stage 2000 may also be referred to, in the present disclosure, as the dome collector 2000. FIGS. 4A-4C are diagrams illustrating an example position of the dome collector 2000 within the BWR 100 according to at least some example embodiments. FIG. 5 is a diagram illustrating an example operation of the dome collector 2000.

Referring to FIGS. 3A-3C, the dome collector 2000 may include a lower section 2010 and an upper section 2020. Further, the dome collector 2000 may include an inner channel 2030 and an outer channel 2040. The outer channel 2040 may also be referred to, herein, as exterior channel 2040. A shape of the inner channel 2030 may be defined by inner side wall 2035. A shape of the outer channel 2040 may be defined by the inner side wall 2035 and outer side wall 2045. As is illustrated in FIGS. 3A-3C, surfaces of inner and outer side walls 2035 and 2045 within the lower section 2010 are substantially straight or flat, and may taper towards the upper section 2020. As is illustrated in FIGS. 3A-3C, surfaces of the inner and outer side walls 2035 and 2045 within the upper section 2020 may be curvilinear such that a cross-sectional shape of the upper section 2020 is that of, for example, a closed circular or annular arch or partial dome. For example at least a portion of the outer side wall 2045 within the upper section 2020 of the dome collector may have a semi-torus shape. Further, at least a portion of the inner side wall 2035 within the upper section 2020 of the dome collector may have a semi-torus shape. According to at least some example embodiments, the upper section 2020 is defined as the portion of the dome collector 2000 above an intersection 2047 between the curvilinear and straight portions of the outer side wall 2045, and the lower section 2010 is defined as the portion of the dome collector 2000 below an intersection 2047 between the curvilinear and straight portions of the outer side wall 2045.

The upper section 2020 may include inlets 2050 that form paths from the inner channel 2030 to the exterior channel 2040, for example, through the inner side wall 2035. Further, the upper section 2020 may include outlets 2060 that form paths from the exterior channel 2040 out of the dome collector 2000, for example, through the outer side wall 2045.

As is illustrated in FIG. 4A, the dome collector 2000 may be positioned above or, alternatively, directly above the separators 1000. FIG. 4B illustrates the dome collector 2000 and peripheral steam separators 1002 from the same perspective described above with respect to FIG. 2. As is illustrated in FIG. 4B, the upper section 2020 of the dome collector 2000 may have a semi-torus shape, and the dome collector 2000 may be positioned above or, alternatively, directly above the separators 1000 such that the semi-torus shape of the upper section 2020 of the dome collector 2000 is vertically aligned with the peripheral steam separators 1002 such that the inner channel 2030 is configured to receive a gas-liquid two-phase FS (e.g., wet steam 600) from the peripheral steam separators 1002. For example, in the example shown in FIGS. 4A and 4B, the dome collector 2000 is positioned above the ring-shaped (i.e., annular) arrangement of peripheral steam separators 1002 such that points A and B of the dome collector 2000 are directly above points A' and B' of the ring-shaped arrangement of peripheral steam separators 1002, respectively. As is shown in FIG. 4C, according to at least some example embodiments, the dome collector 2000, including the lower section 2010 and upper section 2020, may be defined by a 2-dimensional shape 2002. According to at least some example embodiments, a shape of the dome collector 2000 may be defined by rotating the 2-dimensional shape 2002 about an axis 2004 in a circular path having a radius 2006. The radius 2006 illustrated in FIG. 4C is provided for the purpose of facilitating an explanation of an example of the dome collector 2000. A length of the radius 2006 is not limited to the length illustrated in FIG. 4C. According to at least some example embodiments, a length of radius 2006 is set according to the preferences of an operator of the BWR 100 and/or a designer of the dome collector 2000.

Referring to FIG. 5, FIG. 5 illustrates a portion of a first peripheral steam separator 1002A as an example of the peripheral steam separators 1002. FIG. 5 also illustrates a radial cross section of the dome collector 2000.

As is illustrated in FIG. 5, the discharge section of the first peripheral steam separator 1002A may be vertically aligned with the arch-shaped upper section 2020 of the dome collector 2000 such that wet steam 600 that exits an upper end of the first peripheral steam separator 1002A enters the inner channel 2030 of the dome collector 2000. As is illustrated in FIG. 5, the wet steam 600 passes from the inner channel 2030 to the arch-shaped portion of the exterior channel 2040 within the upper section 2020 via inlets 2050. The first peripheral steam separator 1002A illustrated in FIG. 5 extends in a direction that is parallel to the axis 2004 of the dome collector 2000 illustrated in FIG. 4C, and perpendicular to the radius 2006 of the dome collector 2000 illustrated in FIG. 4C. According to at least some example embodiments, some or all of the peripheral steam separators 1002 illustrated in FIG. 5 extend in a direction that is parallel to the axis 2004 of the dome collector 2000 illustrated in FIG. 4C, and perpendicular to the radius 2006 of the dome collector 2000 illustrated in FIG. 4C.

As is illustrated in FIG. 5, once the wet steam 600 passes from the inner channel 2030 to the arch-shaped portion of the exterior channel 2040 within the upper section 2020, separated water 700 may be removed from the wet steam 600. For example, due to the density difference between the liquid (i.e., water) and gas (i.e., steam) portions of the wet steam 600, the curvilinear shape of the exterior channel 2040 within the upper section 2020 may cause the water 700 to separate from the wet steam 600, for example, when the wet steam impacts the curvilinear portion of the outer side wall 2045. As is illustrated in FIG. 5, the water 700 may flow out of the dome collector 2000 via the portions of the exterior channel 2040 within the lower section 2010. The wet steam 600 from which the water 700 is separated becomes moisture-reduced steam 800. The moisture-reduced steam 800 exits the dome collector 2000 via the outlets 2060.

As is noted above, the wet steam 600 may be a gas-liquid two-phase FS in which the gas of the gas-liquid two-phase FS may be steam, and the liquid of the gas-liquid two-phase FS may be water. According to at least some example embodiments, the moisture-reduced steam 800 is the portion of the wet steam 600 that remains after some or all moisture (i.e., water) has been removed from the wet steam 600. For example, the moisture-reduced steam 800 may be a gas-liquid two-phase FS that includes less entrained water than the wet steam 600. As another example, the moisture-reduced steam 800 may be a gas-liquid two-phase FS that includes significantly less entrained water than the wet steam 600 (e.g., a reduction of 50% or more). For example, the moisture-reduced steam 800 may be steam that includes about 10% moisture.

The BWR 100 may process the moisture-reduced steam 800 exhausted from the dome collector 2000 in the same manner explained above with respect to the steam that exits steam separators 1000 in the discussion of FIG. 1. For example, the moisture-reduced steam 800 is supplied to the steam dryer system 500 which may remove additional moisture from the moisture-reduced steam 800. For example, the steam dryer system 500 may receive moisture reduced steam 800 including about 10% moisture and remove much of the residual moisture such that the moisture reduced steam 800 exiting the steam dryer system 500 may include, for example, 0.1% or less moisture. The moisture-reduced steam 800 from which moisture is further removed by the steam dryer system 500 is exhausted from the steam outlet nozzle 15 and drives the turbine 2, thereby causing electrical power to be generated by the generator joined to the turbine 2.

Further, the BWR 100 may process the water 700 separated by the dome collector 2000 in the same manner explained above with respect to the water separated by steam separators 1000 in the discussion of FIG. 1. For example, in the example shown in FIGS. 3A-5, the water 700 separated by the dome collector 2000 is mixed with the cooling water supplied from the feed water inlet nozzle 17, descends the annular space 9, and is introduced to the core 7 via the lower plenum 10.

Though, for the purpose of simplicity, only a single peripheral steam separator 1002A is illustrated in FIG. 5, all peripheral steam separators 1002 may interact with, and/or be positioned with respect to, corresponding portions of the dome collector 2000 in the same manner discussed below with respect to the first peripheral steam separator 1002A. According to at least some example embodiments, a portion of the dome collector 2000 that corresponds to a particular steam separator is the portion of the dome collector 2000 that is located in the vicinity of the particular steam separator, including, for example, the portion of the dome collector 2000 that is located directly above an upper opening of the particular steam separator.

FIGS. 3A-5 are explained above with respect to an example in which the dome collector 2000 is positioned directly above peripheral steam separators 1002 among the steam separators 1000. However, according to at least some example embodiments, the dome collector 2000 may not be positioned directly above the peripheral steam separators 1002, and may be positioned directly above interior steam separators. As used herein, the term "interior steam separator" refers to a steam separator, from among the steam separators 1000, that is not one of the peripheral steam separators 1002. Further, according to at least some example embodiments the dome collector 2000 may be positioned directly above both one or more interior steam separators and one or more of the peripheral steam separators 1002. Further, according to at least some example embodiments the dome collector 2000 may be positioned directly above one or more of the peripheral steam separators 1002 and none of the interior steam separators. According to at least some example embodiments, any steam separator, from among the steam separators 1000, may interact with corresponding portions of the dome collector 2000 in the same manner discussed below with respect to the first peripheral steam separator 1002A.

Accordingly, the dome collector 2000 may reduce moisture carry-over, thereby preventing and/or reducing the exposure of components of the BWR 100 (e.g., a main steam line and/or a turbine 2) to prolonged high radioactivity levels during operation of the BWR 100. Further, it may be desirable to use the dome collector 2000 within a BWR that is performing uprated power generation. For example, in a BWR configured to perform uprated power generation, a flow of coolant (e.g., light water) throughout the BWR may be increased, and thus, the moisture content of wet steam produced by peripheral steam separators of the BWR may be increased. The dome collector 2000 can remove water from the wet steam so as to reduce and/or prevent exposure of components of the BWR, which is configured to perform uprated power generation, to prolonged high radioactivity levels caused, for example, by the radioactivity carried by entrained water droplets.

According to at least some example embodiments, the material of any or all of the components of the dome collector 2000 may be stainless steel. For example, according to at least some example embodiments, the inner side wall 2035 and outer side wall 2045 (e.g., including inlets 2050 and/or and outlets 2060) may be composed of stainless steel. According to at least some example embodiments, the stainless steel of which the dome collector 2000 and/or components of the dome collector 2000 are composed may be type 304 stainless steel. Further, according to at least some example embodiments, any of inner walls of dome collector 2000 (e.g., inner surfaces of the inner channel 2030, outer channel 2040, inlets 2050 and/or and outlets 2060), may be coated with an anti-fouling agent in order to minimize or reduce losses due to surface friction. The anti-fouling agent may be $TiO_2$, which is described in U.S. Patent Publication No. 2010/0055308, the contents of which are incorporated herein by reference.

Another example of an additional separation stage, an elbow extension additional separation stage, will now be discussed below with reference to FIGS. 6A-7.

Elbow Extension Additional Separation Stage

FIGS. 6A-6E illustrate various views of portions of an elbow extension additional separation stage 3000 according to at least some example embodiments. FIG. 7 is a diagram illustrating an example position of the elbow extension additional separation stage 3000 within the BWR 100 according to at least some example embodiments. The elbow extension additional separation stage 3000 may also be referred to, in the present disclosure, as the elbow extension 3000. As will be discussed in greater detail below, according to at least some example embodiments, one or more elbow extensions having the structure of the elbow extension 3000 may be provided in addition to the separators 1000 to reduce the amount of water that is passed, within the gas-liquid two-phase FS, to at least some components of the BWR 100 (e.g., the dryer system 500, main steam line, and/or turbine 2).

Figure 6A:
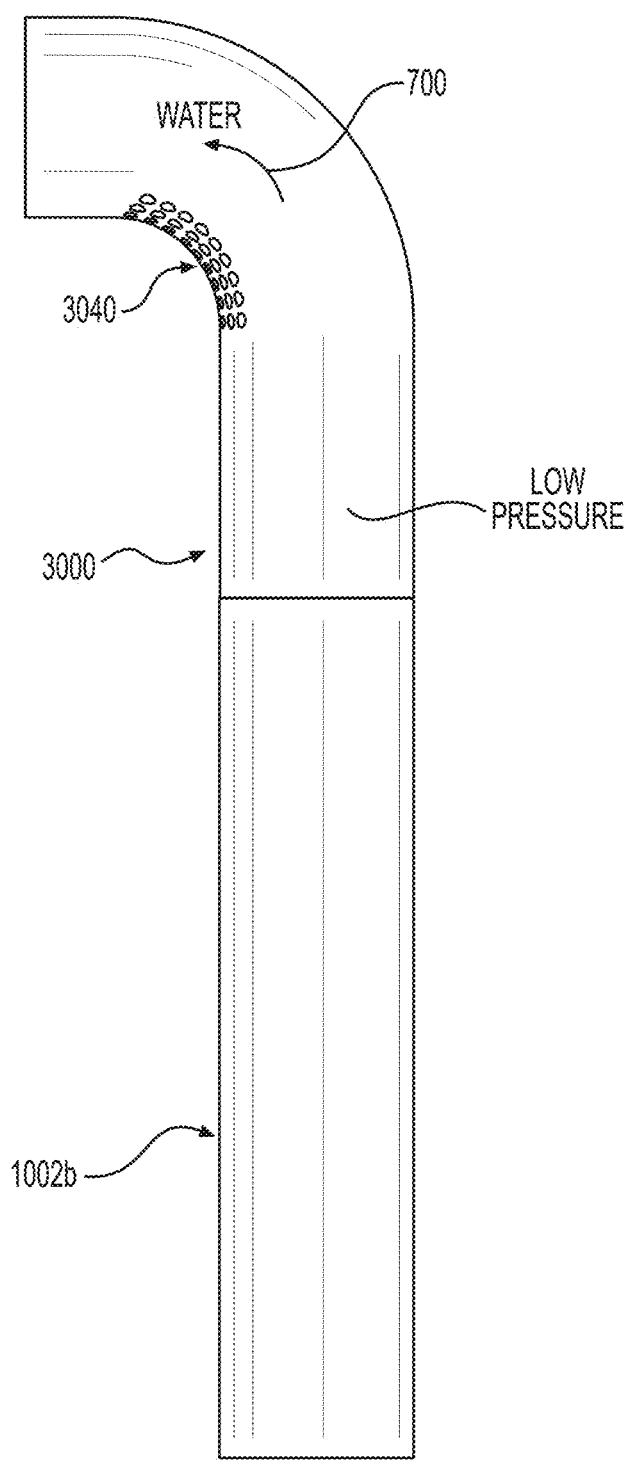
FIGS. 6A-6E illustrate various views of portions of an elbow extension additional separation stage according to at least some example embodiments.
Figure 6B:
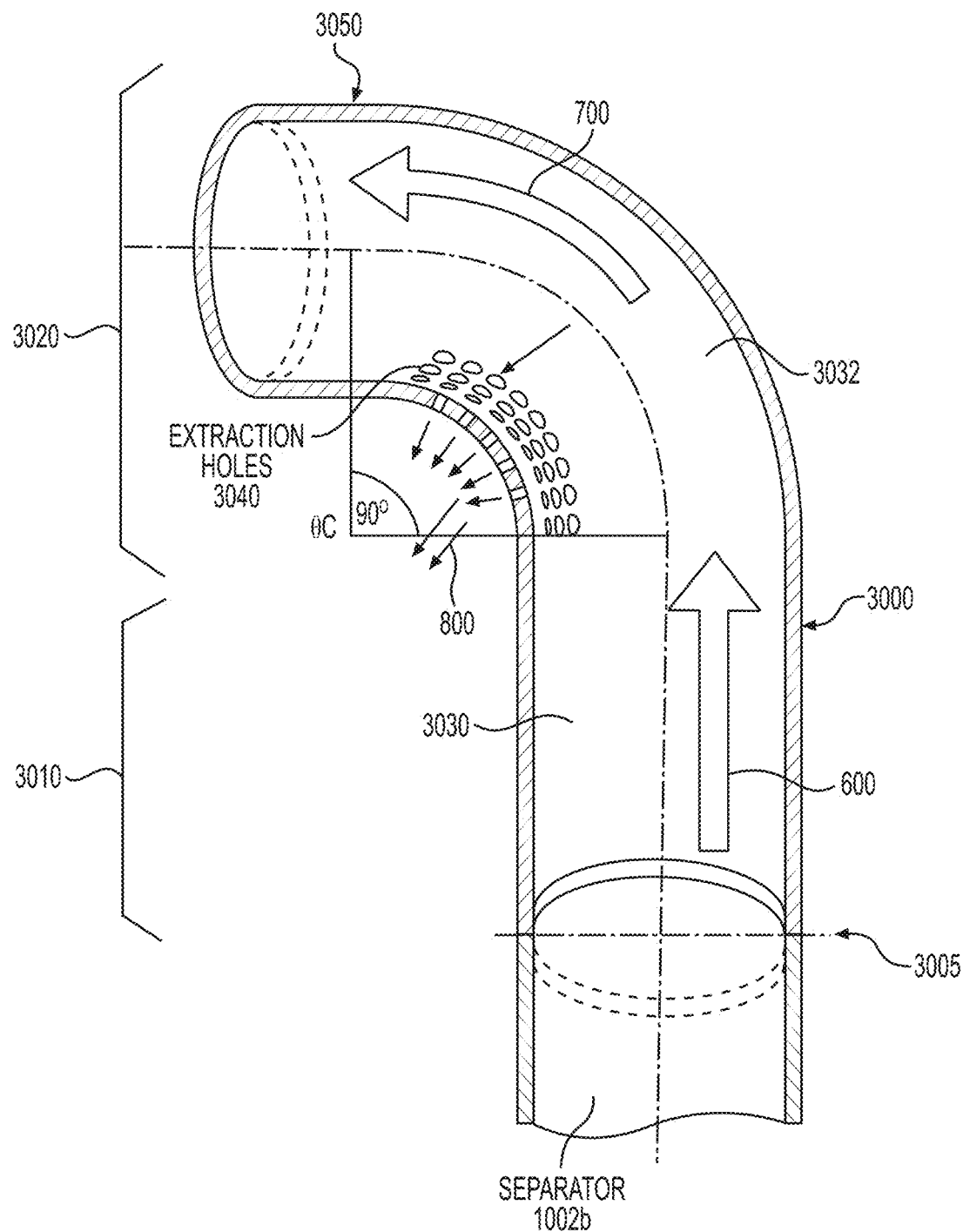
Figure 6C:
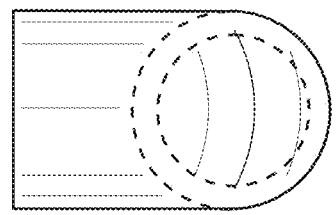
Figure 6D:
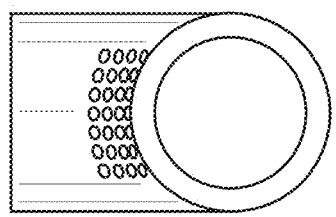
Figure 6E:
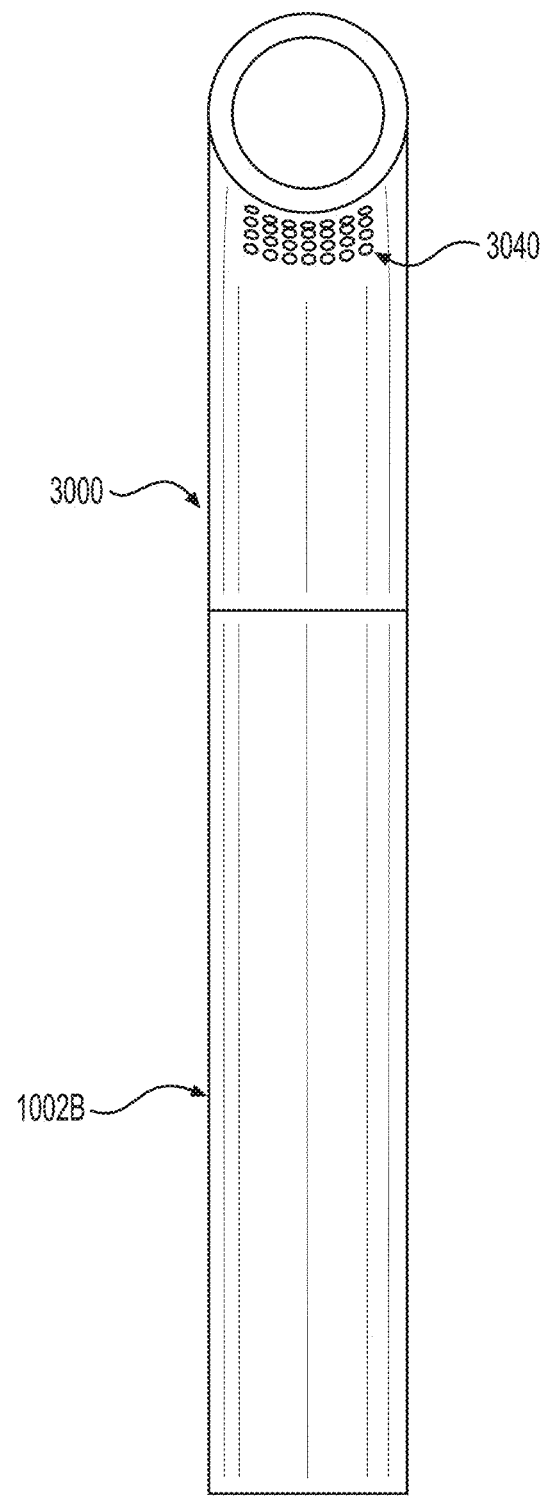

FIG. 6A is a longitudinal cross section of the elbow extension 3000. FIG. 6B is a perspective view of the elbow extension 3000. FIGS. 6C and 6D are views from above and below the elbow extension 3000, respectively. FIG. 6E is a view from in front of an exit portion of the elbow extension 3000. As is illustrated in FIGS. 6A, 6B and 7, the elbow extension 3000 may be an extension of a steam separator from among the steam separators 1000. For example, the elbow extension 3000 may be a barrel that extends from a barrel of a steam separator from among the steam separators 1000. According to at least some example embodiments, the elbow extension 3000 may be an extension of one of the peripheral steam separators 1002. In the example shown in FIGS. 6A, 6B and 7, the elbow extension 3000 is attached to a second peripheral steam separator 1002B from among the peripheral steam separators 1002. According to at least some example embodiments, the elbow extension 3000 may be attached to an upper portion of the second peripheral steam separator 1002B (i.e., a portion of the second peripheral steam separator 1002B closest to the dryer system 500 in the example illustrated in FIG. 7). According to at least some example embodiments, the elbow extension 3000 and second peripheral steam separator 1002B form a steam separation system.

According to at least some example embodiments, the elbow extension 3000 is a barrel that includes a linear section 3010, a curved section 3020, an extension channel 3030, extraction holes 3040, and an exit portion 3050.

As is illustrated in FIGS. 6A-6C and 7, the linear section 3010 of the elbow extension 3000 may extend from the second peripheral steam separator 1002B in a direction parallel, or substantially parallel, to the direction in which the second peripheral steam separator 1002B extends towards the elbow extension. Further, the curved section 3020 of the elbow extension 3000 may extend from the linear section 3010 and may include a curve or bend having an angle of curvature θC. According to at least some example embodiments, the angle of curvature θC refers to an angular difference between (i) a direction in which the elbow extension 3000 extends before the curvature in the curved section 3020, and (ii) a direction in which the elbow extension 3000 extends after the curvature in the curved section 3020 (e.g., at the exit portion 3050). For example, the view direction of FIG. 6E is parallel to the direction in which the elbow extension 3000 extends after the curvature in the curved section 3020. In the examples illustrated in FIGS. 6A-7, the angle of curvature θC is 90°. However, according to at least some example embodiments, the angle of curvature θC may be less than or more than 90°. For example, the angle of curvature may be 45° or 135°, or an angle in between 45° and 135°. According to at least some example embodiments, the angle of curvature θC may be chosen in accordance with the preferences of an operator of the BWR 100 and/or a designer of the elbow extension 3000, for example, based on empirical information.

The extension channel 3030 is the interior region of the elbow extension 3000. For example, the elbow extension 3000 may be a barrel, as is noted above, and the extension channel 3030 may be the interior region of the barrel. According to at least some example embodiments, a shape of the elbow extension 3000 at an interface region 3005 where the elbow extension 3000 interfaces with the peripheral steam separator 1002B may be configured to interface with the shape of the second peripheral steam separator 1002B. In the example shown in FIGS. 6A-6C and 7, the elbow extension 3000 and the second peripheral steam separator 1002B are both cylindrical (i.e., tubular) in shape at the interface region 3005. According to at least some example embodiments, the exit portion 3050 is the end of the elbow extension 3000 opposite the interface region 3005.

As is illustrated in FIG. 6B wet steam 600 that exits the second peripheral separator 1002B during operation of the BWR 100 may flow into the channel 3030. Due to, for example, centripetal force exerted on the wet steam 600, water 700 is separated from the wet steam 600. For example, the above-referenced centripetal force may result from the wet steam 600 flowing from the second peripheral separator 1002B through extension channel 3030 and interacting with the concave portion 3032 of the extension channel 3030 within the curved section 3020 of the elbow extension 3000. The water 700 may flow out of the exit portion 3050.

According to at least some example embodiments, the elbow extension is arranged such that the exit portion 3050 points outward towards (e.g., faces), for example, a portion of an interior surface of the cylindrical dryer skirt 350 nearest to the elbow extension 3000, or a portion of an interior surface of the side wall of the pressure vessel 6 nearest to the elbow extension 3000. Consequently, the water 700 flowing out the exit portion 3050 may be directed towards the dryer skirt 350 and/or side wall of the pressure vessel 6, and not towards the dryer system 500. According to at least some example embodiments, the BWR 100 may process the water 700 flowing out of the extension channel 3030 in the same manner explained above with respect to the water separated by steam separators 1000 in the discussion of FIG. 1. In the example illustrated in FIGS. 6A-7, the water 700 separated by the elbow extension 3000 is mixed with the cooling water supplied from the feed water inlet nozzle 17, descends the annular space 9, and is introduced to the core 7 via the lower plenum 10.

Further, the moisture-reduced steam 800 remaining after the separation of the water 700 from the wet steam 600 may exit the channel 3030 via the extraction holes 3040 located in the convex portion (e.g., convex surface) 3034 of the extension channel 3030 within the curved section 3020 of the elbow extension 3000. Alternatively, the extraction holes 3040 may be omitted from the elbow extension 3000, in which case the moisture-reduced steam 800 may exit the extension channel 3030 via the exit portion 3050.

According to at least some example embodiments, the BWR 100 may process the moisture-reduced steam 800 that exits the elbow extension 3000 in the same manner explained above with respect to the steam that exits steam separators 1000 in the discussion of FIG. 1. In the example illustrated in FIGS. 6A-7, the moisture-reduced steam 800 that exits the elbow extension 3000 is supplied to the steam dryer system 500 which may remove additional moisture from the moisture-reduced steam 800, for example, in a case where moisture-reduced steam 800 produced by the elbow extension 3000 still includes moisture. The moisture-reduced steam 800 from which moisture is further removed by the steam dryer system 500 is exhausted from the steam outlet nozzle 15 and drives the turbine 2, thereby causing power to be generated by the generator joined to the turbine 2.

Figure 7:
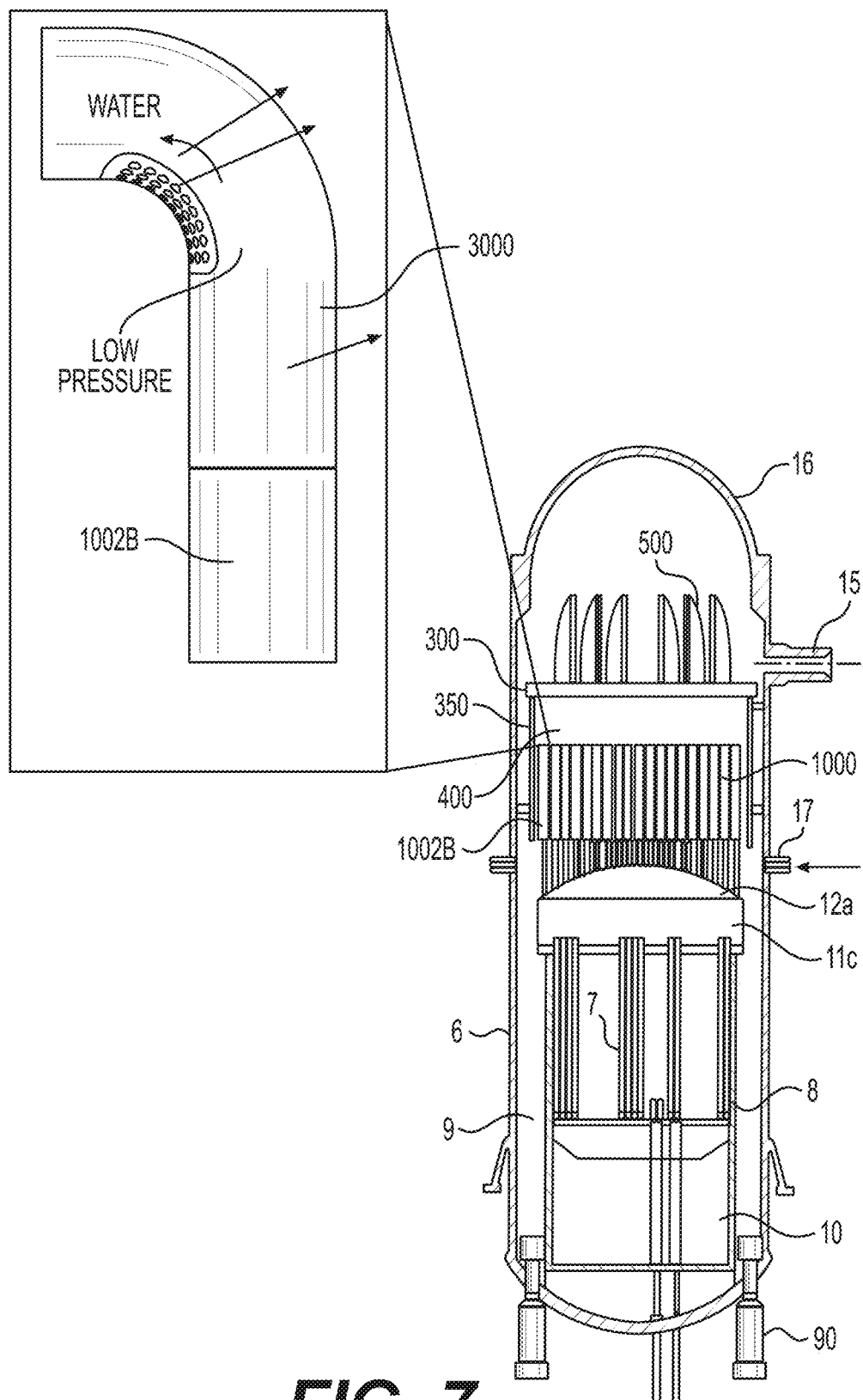
FIG. 7 is a diagram illustrating an example position of the elbow extension additional separation stage within the BWR according to at least some example embodiments.

Though, for the purpose of simplicity, only a single elbow extension 3000 and a single peripheral steam separator 1002B are illustrated in FIGS. 6A, 6B and 7, elbow extensions having the same structure and operation described above with respect to the elbow extension 3000 may be attached to any or all of the peripheral steam separators 1002 (or, any or all of the steam separators 1000), respectively. For example, according to at least some example embodiments, elbow extensions according to example embodiments may not be attached to the peripheral steam separators 1002, and may be attached only to the interior steam separators, respectively. Further, elbow extensions according to example embodiments may be attached to one or more interior steam separators and one or more of the peripheral steam separators 1002, respectively. Further, according to at least some example embodiments the elbow extensions according to example embodiments may be attached to one or more of the peripheral steam separators 1002, respectively, and attached to none of the interior steam separators. Further, the elbow extensions according to example embodiments may interact with (and be oriented with respect to) the steam separators to which the elbow extensions are attached in the same manner discussed above with respect to the elbow extension 3000 and the second peripheral steam separator 1002B.

Accordingly, the elbow extension 3000 may reduce moisture carry-over, thereby preventing and/or reducing the exposure of components of the BWR 100 (e.g., a main steam line and/or a turbine 2) to prolonged high radioactivity levels during operation of the BWR 100. Further, it may be desirable to use one or more elbow extensions 3000 within a BWR that is performing uprated power generation. For example, in a BWR configured to perform uprated power generation, a flow of coolant (e.g., light water) throughout the BWR may be increased, and thus, the moisture content of wet steam produced by peripheral steam separators of the BWR may be increased. The one or more elbow extensions 3000 can remove water from the wet steam so as to reduce and/or prevent exposure of components of the BWR, which is configured to perform uprated power generation, to prolonged high radioactivity levels caused, for example, by the radioactivity carried by entrained water droplets.

According to at least some example embodiments, the material of any or all of the components of the elbow extension 3000 may be stainless steel. For example, according to at least some example embodiments, the barrel of the elbow extension (e.g., including the linear section 3010, curved section 3020, extension channel 3030, and an exit portion 3050) may be composed of stainless steel. According to at least some example embodiments, the stainless steel of which the elbow extension 3000 and/or components of the elbow extension 3000 are composed may be type 304 stainless steel. Further, according to at least some example embodiments, inner walls of the barrel of the elbow extension 3000 (e.g., the extension channel 3030) and/or the extraction holes 3040 may be coated with an anti-fouling agent in order to minimize or reduce losses due to surface friction. The anti-fouling agent may be $TiO_2$, which is described in U.S. Patent Publication No. 2010/0055308.

Another example structure for removing water from wet steam, streamlined separator pick-off rings, according to at least some example embodiments will be discussed below with reference to FIGS. 8-10.

Streamlined Steam Separator Including Pick-Off rings

Figure 8:
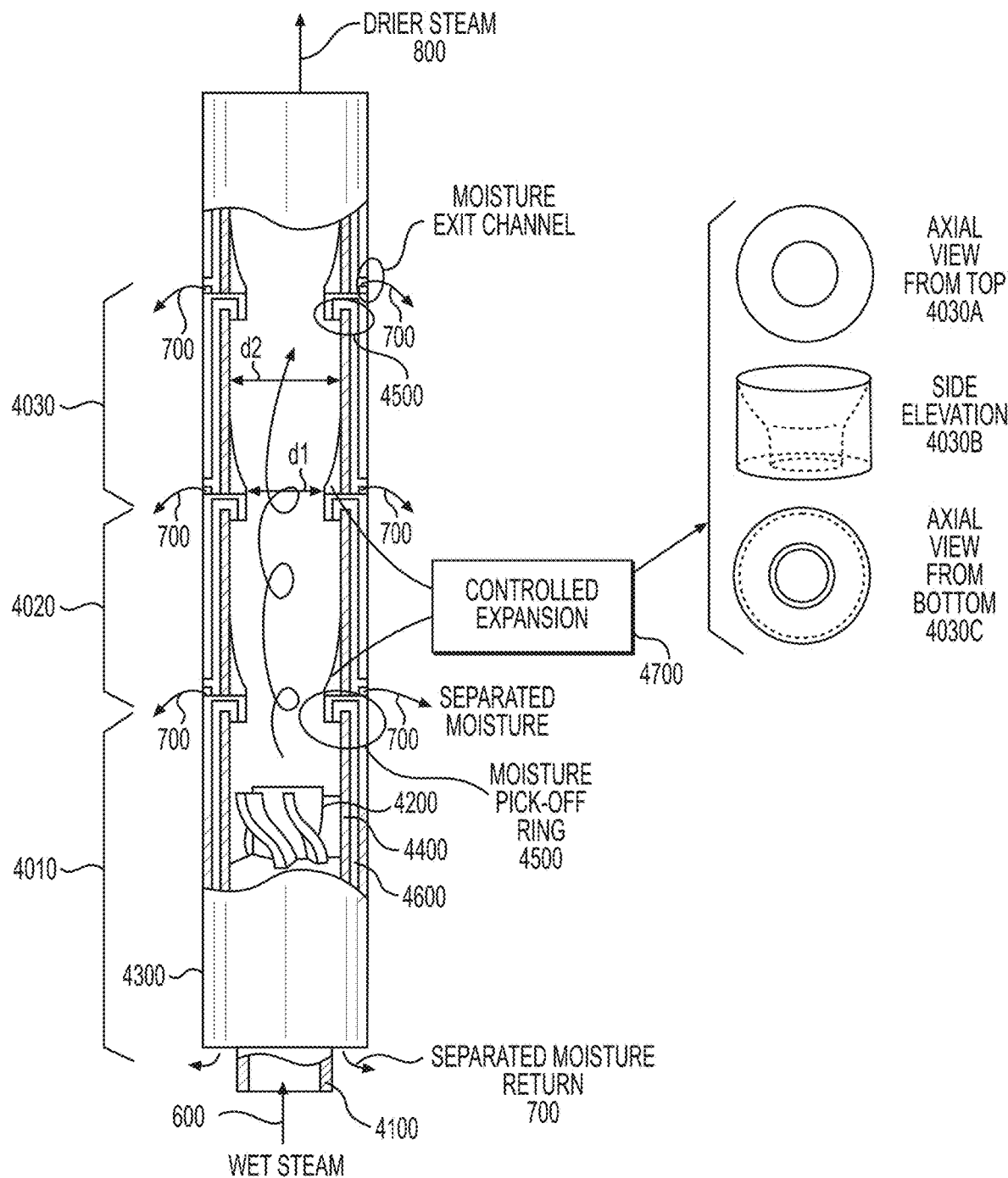
FIG. 8 illustrates a streamlined steam separator that includes pickoff rings.

FIG. 8 illustrates a streamlined steam separator that includes pickoff rings. According to at least some example embodiments, any or all of the steam separators 1000 may have the structure of the steam separator 4000. The steam separator 4000 includes a plurality of separator stages including a first separator stage 4010, a second separator stage 4020, and a third separator stage 4030. The steam separator 4000 includes a standpipe 4100 through which the steam separator 4000 receives wet steam 600. The wet steam passes through turning vanes 4200 included in the first separator stage 4010. Further, each of the plurality of separator stages included in the steam separator 4000 is structured to remove moisture from the wet steam 600. For the purpose of simplicity, FIGS. 8-10 will be explained with reference first through third separator stages 4010-4030. However, the steam separator 4000 is not limited to having three separator stages. For example, according to at least some example embodiments, the plurality of separator stages included in the steam separator 4000 may have two separator stages. Further, according to at least some example embodiments, the plurality of separator stages included in the steam separator 4000 may have more than three separator stages.

For example, the steam separator 4000 may include a skirt 4300 and a separator barrel 4400 inside the skirt 4300. As is illustrated in FIG. 8, the skirt 4300 and separator barrel 4400 may each be tubular in shape. Further, each of the first through third separator stages 4010-4030 includes a moisture pick-off ring 4500. Using the third separator stage 4030 as an example, the moisture pick-off ring 4500 of the third separator stage 4030 includes a lip that protrudes from the skirt 4300 past the separator barrel 4400 towards a central axis of the steam separator 4000 so as to separate water 700 from the wet steam 600 by capturing the water 700 and directing the water 700 through a discharge passage 4600 formed by the space between the skirt 4300 and separator barrel 4400, as is illustrated in FIG. 8. As is also illustrated in FIG. 8, a path of the discharge passage 4600 includes one or more openings in the skirt 4300 through which the water 700 captured by the pick-off ring 4500 of the third separator stage 4030 exits the separator 4000. The moisture pick-off rings 4500 of the first and second separator stages 4010 and 4020 may operate in the same manner discussed above with respect to the moisture pick-off ring 4500 of the third separator stage 4030. Moisture-reduced steam 800 exits the steam separator 4000 through an opening at the top end of the steam separator 4000 (i.e., the end of the steam separator opposite to the end at which the standpipe 4100 is located). The moisture-reduced steam 800 that exits the top of the separator 4000 is the portion of the wet steam 600 remaining after the water 700 is removed by each of the plurality of separator stages included in the steam separator 4000.

According to at least some example embodiments of the inventive concepts, any or all of the plurality of separator stages included in the steam separator 4000 (including, for example, first through third separator stages 4010-4030) may include a controlled expansion region 4700. For the purpose of simplicity, FIGS. 8 and 9 are explained with reference, primarily, to the controlled expansion region 4700 of the third separator stage 4030. However, according to at least some example embodiments, the description of the controlled expansion region 4700 of the third separator stage 4030 may apply to a controlled expansion region 4700 of any separator stage in the steam separator 4000 that includes a controlled expansion region 4700. Item 4030A in FIG. 8 illustrates an axial view of the controlled expansion region 4700 of the third separator stage 4030 from a position above the third separator stage 4030 looking down towards the standpipe 4100. Item 4030B in FIG. 8 illustrates a side elevation view of the controlled expansion region 4700 of the third separator stage 4030. Item 4030C in FIG. 8 illustrates an axial view of the controlled expansion region 4700 of the third separator stage 4030 from a position below the third separator stage 4030 looking up in the same direction in which the moisture-reduced steam 800 flows out of the steam separator 4000.

Within the controlled expansion region 4700 of the third separator stage 4030, a diameter of the third separator stage 4030 gradually increases from a first diameter d1 to a larger second diameter d2. The first diameter d1 is the diameter of the moisture pick-off ring 4500 of the second separator stage 4020 that protrudes towards the central axis of the steam separator 4000. As is illustrated in FIG. 8, the second separator stage 4020 also includes a controlled expansion region 4700. Within the controlled expansion region 4700 of the second separator stage, a diameter of the second separator stage 4020 gradually increases from the first diameter d1 to the larger second diameter d2. According to at least some example embodiments, any separator stage having an adjacent lower separator stage may include a controlled expansion region 4700.

Figure 9:
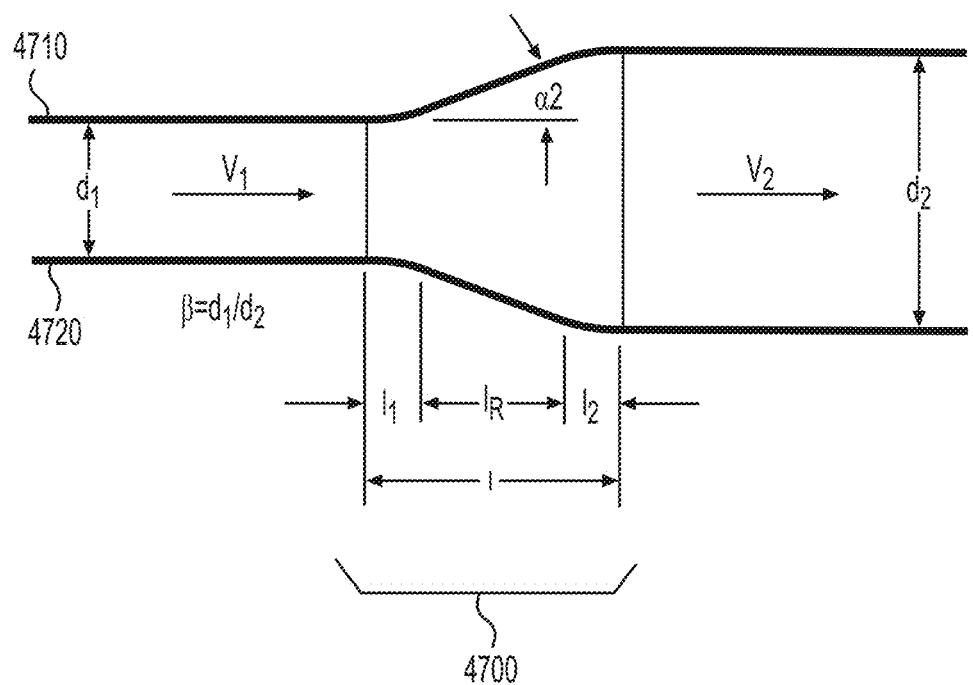
FIG. 9 is a diagram for explaining the controlled expansion regions 4700 between adjacent separator stages of the streamlined steam separator in greater detail.

FIG. 9 is a diagram for explaining the controlled expansion regions 4700 between adjacent separator stages of the steam separator 4000 in greater detail. FIG. 9 illustrates an upper line 4710 and a lower line 4720. Lines 4710 and 4720 represent the contours of adjacent separator stages within the steam separator 4000. For the purpose of simplicity, FIG. 9 will be explained with respect to an example in which lines 4710 and 4720 represent the contours of the second and third separator stages 4020 and 4030. However, lines 4710 and 4720 may represent the contours of any adjacent separator stages.

Referring to FIG. 9, lines 4710 and 4720 transition from being separated by the diameter d1 on the left to being separated by the larger diameter d2 on the right. As is illustrated in FIG. 9, the transition from the first diameter d1 to the larger diameter d2 takes place within the controlled expansion region 4700. Further, in the example illustrated in FIG. 9, the controlled expansion region 4700 includes three sections: a first curved section L1, and angled section LR, and a second curved section L2. Within the first curved section L1, lines 4710 and 4720 transition from being parallel lines having the first diameter d1 to being the substantially straight and angled lines of the angled section LR. Within the second curved section L2, lines 4710 and 4720 transition from being the substantially straight and angled lines of the angled section LR to being parallel lines having the second diameter d2. In the example shown in FIG. 9, the degree to which the angled lines in the angled section LR are angled relative to the portions of lines 4710 and 4720 in which lines 4710 and 4720 are parallel is expressed as half angle α/2. In the example shown in FIG. 9, the controlled expansion region 4700 has total length L. Consequently, the transition from the first diameter d1 to the second diameter d2 takes place gradually over the length L.

Figure 10:
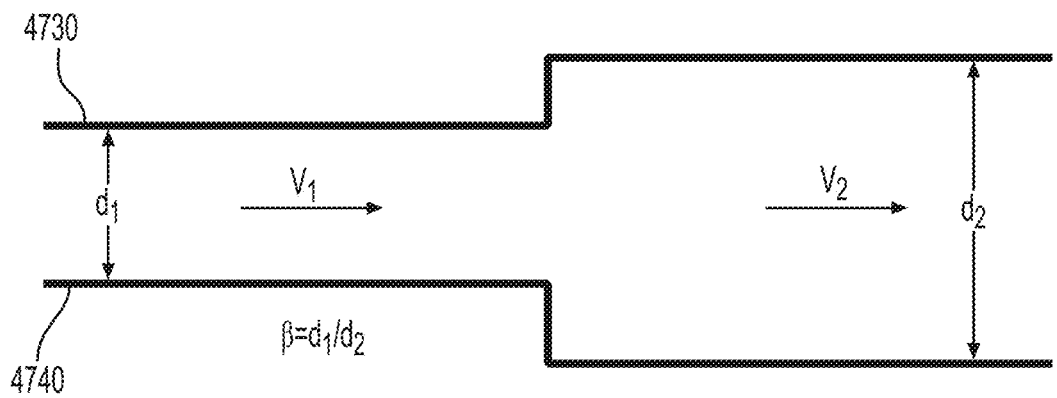
FIG. 10 is a diagram for explaining adjacent separator stages that lack a controlled expansion region.

FIG. 10 is a diagram for explaining adjacent separator stages that lack a controlled expansion region. FIG. 10 illustrates an upper line 4730 and a lower line 4740. As is illustrated in FIG. 10, lines 4730 and 4740 are arranged in the same manner as lines 4710 and 4720 of FIG. 9, with the exception that lines 4730 and 4740 lack a controlled expansion region 4700. Consequently, the change between the first and second diameters d1 and d2 in lines 4730 and 4740 is abrupt, and not gradual. Some conventional steam separators include adjacent separator stages having contours corresponding to the upper and lower lines 4730 and 4740 of FIG. 10. Further, the abrupt diameter change causes a substance (e.g., wet steam) that flows through a pair of adjacent separator stages having contours corresponding to the upper and lower lines 4730 and 4740 of FIG. 10 to experience pressure loss.

In comparison, the steam separator 4000 of FIG. 8 is streamlined with respect to a conventional steam separator that includes separator stages having the contours discussed above with respect to FIG. 10. For example, a substance (e.g., wet steam) that flows through a pair of adjacent separator stages having contours corresponding to the upper and lower lines 4710 and 4720 (e.g., the first and second separator stages 4010 and 4020, or the second and third separator stages 4020 and 4030) may experience substantially reduced pressure loss due to the gradual diameter change provided by the controlled expansion region 4700. According to at least some example embodiments, the reduction in pressure loss increases as the half angle α/2 becomes smaller. Additionally, with respect to wet steam, according to at least some example embodiments, the controlled expansion region 4700 may reduce or eliminate flow separation and annular recirculation regions at points where adjacent separator stages of the streamlined steam separator 4000 interface with each other. Further, with respect to wet steam, according to at least some example embodiments, the controlled expansion region 4700 may reduce or eliminate re-entrainment of separated liquid from rolling waves at points where adjacent separator stages of the streamlined steam separator 4000 interface. Further, according to at least some example embodiments, the elimination of abrupt diameter transitions within the streamlined steam separator 4000 improves water segregation. Further, the controlled expansion region 4700 may prevent an increase to moisture carry-over that would be caused by moisture condensation resulting from the large pressure drop which would otherwise occur in the vicinity of the pick-off rings of the separator stages of the steam separator 4000.

According to at least some example embodiments, the material of any or all of the components of the streamlined steam separator 4000 may be stainless steel. For example, according to at least some example embodiments, the skirt 4300 and the barrel 4400 may be composed of stainless steel. Further, according to at least some example embodiments, the moisture pick-off rings 4500 and the controlled expansion region 4700 of each of the plurality of separator stages in the steam separator 4000 may be composed of stainless steel. According to at least some example embodiments, the stainless steel of which the streamlined steam separator 4000 and/or components of the streamlined steam separator 4000 are composed may be type 304 stainless steel. Further, according to at least some example embodiments, inner walls of the barrel 4400, inner walls of the controlled expansion regions 4700, and/or inward-facing portions of the moisture pick-off rings 4500 may be coated with an anti-fouling agent in order to minimize or reduce losses due to surface friction. The anti-fouling agent may be $TiO_2$, which is described in U.S. Patent Publication No. 2010/0055308.

Example embodiments thus being described, it will be appreciated by one skilled in the art that example embodiments may be varied through routine experimentation and without further inventive activity. Variations are not to be regarded as a departure from the spirit and scope of the example embodiments, and all such modifications as would be obvious to one skilled in the art are intended to be included within the scope of the following claims.

We claim:
1. A steam separation system comprising:
a steam separator; and
an elbow extension attached to the steam separator,
the elbow extension including a tubular structure that defines an extension channel within the tubular structure,
the elbow extension configured to receive a two-phase flow stream (FS) of water and steam from the steam separator, separate at least some water from the two-phase FS, and pass the separated at least some water through the extension channel and out of an exit portion of the elbow extension,
wherein the tubular structure includes a curved section, and
wherein a surface of the curved section of the tubular structure defines a plurality of extraction holes configured to pass moisture-reduced steam out of the elbow extension by passing the moisture-reduced steam from the portion of the extension channel within the curved section of the tubing structure to an exterior of the tubular structure.

2. The steam separation system of claim 1, wherein the curved section of the tubular structure is configured to cause the at least some water to separate from the two-phase FS due to a centripetal force exerted on the two-phase FS as a result of the two-phase FS flowing through the curved section.

3. A nuclear boiling water reactor comprising:
a reactor pressure vessel;
a core in the reactor pressure vessel; and
one or more steam separation systems according to claim 2 located above the core.

4. The nuclear boiling water reactor of claim 3 wherein,
the one or more steam separation systems are located in a peripheral portion of an interior space of the reactor pressure vessel such that the exit portion of each of the one or more steam separation systems faces an inner surface of a side wall of the reactor pressure vessel.

* * * * *